(12) United States Patent
Maram et al.

(10) Patent No.: US 7,633,671 B2
(45) Date of Patent: *Dec. 15, 2009

(54) HIGH SPEED BEAM STEERING

(75) Inventors: Jonathan M. Maram, Palo Alto, CA (US); Jeffrey H. Hunt, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 63 days.

This patent is subject to a terminal disclaimer.

(21) Appl. No.: 11/863,954

(22) Filed: Sep. 28, 2007

(65) Prior Publication Data
US 2008/0018986 A1    Jan. 24, 2008

Related U.S. Application Data

(63) Continuation-in-part of application No. 11/102,169, filed on Apr. 8, 2005, now Pat. No. 7,283,291.

(51) Int. Cl.
*G02F 1/29* (2006.01)
*G02F 1/13* (2006.01)

(52) U.S. Cl. .......... 359/298; 349/201; 349/202
(58) Field of Classification Search ........... 349/201, 349/202; 359/245, 298, 315, 850, 851
See application file for complete search history.

(56) References Cited

U.S. PATENT DOCUMENTS

| | | | |
|---|---|---|---|
| 4,937,539 A | | 6/1990 | Grinberg et al. |
| 5,151,814 A | | 9/1992 | Grinberg et al. |
| 5,801,799 A | | 9/1998 | Chen et al. |
| 6,456,419 B1 | | 9/2002 | Winker et al. |
| 6,587,180 B2 | | 7/2003 | Wang et al. |
| 6,879,431 B2 | | 4/2005 | Ide |
| 7,154,658 B2 | * | 12/2006 | Maram et al. ........ 359/279 |
| 7,203,210 B2 | | 4/2007 | Sox et al. |
| 7,283,291 B2 | * | 10/2007 | Maram et al. ........ 359/298 |
| 7,502,154 B2 | * | 3/2009 | Maram et al. ........ 359/239 |
| 2005/0206773 A1 | * | 9/2005 | Kim et al. ........... 348/340 |

* cited by examiner

*Primary Examiner*—David N Spector
(74) *Attorney, Agent, or Firm*—Haynes and Boone, LLP

(57) ABSTRACT

The use of spatial light modulators to steer light beams is disclosed. A dual frequency liquid crystal spatial light modulator can be controlled so as to form a blazed phase grating thereon that effects desire deflection of incident light.

8 Claims, 3 Drawing Sheets

HIGH SPEED BEAM STEERING

RELATED APPLICATION

This patent application is a continuation-in-part patent application of U.S. Ser. No. 11/102,169 filed on Apr. 8, 2005 now U.S. Pat. No. 7,283,291 and entitled HIGH SPEED BEAM STEERING/FIELD OF VIEW ADJUSTMENT, the entire contents of which are hereby incorporated by reference.

TECHNICAL FIELD

The present invention relates generally to optics and, more particularly, to an apparatus and method for steering a beam of light using a spatial light modulator.

BACKGROUND

Light beams are used in a wide variety of different applications, such as communications, imagery, and weaponry. In such applications it is frequently necessary to steer a beam of light. In some such applications, beam steering must be performed rapidly.

Beam steering is useful in optical communications, where a modulated light beam originating at a transmitter must be aimed toward a remote receiver. Beam steering is also useful in directed energy weaponry, where a light beam must be aimed toward a distant target. In such instances, it can be desirable to rapidly steer the beam from one receiver or target to another.

Mechanical systems for accomplishing beam steering are well known. Such mechanical systems include those that utilize movable optical components. For example, a mirror may be aimed so as to effect desired beam steering.

However, as those skilled in the art will appreciate, such mechanical components are subject to wear. Not only can wear contribute to premature failure, but it can also adversely affect the accuracy of a mechanical beam steering system prior to or in the absence of failure.

Further, such mechanical systems have strict speed limitations. These speed limitations are due, in part, to the inertia of the moving components. Drive motor capacities, current limitations, and structural constraints also contribute to such speed limitations.

Further, the mechanical components (mirrors, drive motors, gimbals, and linkages) of such systems have substantial weight and volume. The weight and volume of such mechanical systems makes them unsuitable for some applications. For example, launch vehicle payload weight and volume restrictions may limit the use of mechanical systems in space-based applications.

Non-mechanical beam steering systems are also known. However, contemporary non-mechanical systems require high voltages and/or expensive technology, thus making them unsuitable for many applications.

In view of the shortcomings of such contemporary systems, there is a need for lightweight, small, non-mechanical beam steering systems that respond rapidly and do not require high voltages for operation.

SUMMARY

The use of spatial light modulators, such as dual frequency liquid crystal spatial light modulators, to steer light beams is disclosed. Dual frequency liquid crystal spatial light modulators have rapid response times that make them suitable for use in many time critical applications, such as battlefield communications, real time imaging, and directed energy weaponry. Dual frequency liquid crystal spatial light modulators are substantially lighter in weight as compared to their mechanical counterparts, thus making them particularly desirable for use in space-based applications.

According to an embodiment, a method for steering a beam of light comprises using a blazed phase grating to varying a angle at which light incident upon the blazed phase grating is transmitted from the blazed phase grating.

According to an embodiment, a method for adjusting a field of view comprises using a blazed phase grating to determine the field of view incident upon an imager.

According to an embodiment, a method for adjusting a field of view comprises communicating light from a field of view to a spatial light modulator, controlling the spatial light modulator so as to communicate the light therefrom to an imaging device, and receiving the light by the imaging device.

According to an embodiment, a dual frequency liquid crystal spatial light modulator can be controlled so as to form a phase grating thereon that effects desire deflection of incident light. For example, a blazed phase grating can be formed on a dual frequency liquid crystal spatial light modulator. Blazed phase gratings are especially efficient at deflecting light.

According to an embodiment, the deflection of light can be used for beam steering. Thus, a dual frequency liquid crystal spatial light modulator can used be to direct a beam of light used for communications.

According to an embodiment, a dual frequency liquid crystal spatial light modulator can be electronically controlled so as to provide the desired deflection of light. Such electronic control is possible because dual frequency liquid crystal spatial light modulators are rapidly programmable and quickly responsive to such programming. That is, a blazed phase grating can be quickly defined and implemented so as to provide the desired degree of light deflection.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

At least one embodiment of the present invention comprises a liquid crystal spatial light modulator, such as a dual frequency liquid crystal spatial light modulator, that is configured to facilitate beam steering. Such embodiments of the present invention may find application in optical communications and directed energy weaponry, for example. As those skilled in the art will appreciate, dual frequency liquid crystal spatial light modulators provide enhanced speed and controllability with respect to other types of spatial light modulators.

Thus, at least one embodiment of the present invention comprises a non-mechanical way to rapidly change the deflection angle of a light beam, so as to direct the light beam toward a desired target. More particularly, at least one embodiment of the present invention comprises a dual frequency liquid crystal spatial light modulator, electronic means to induce a blazed grating pattern on the dual frequency liquid crystal spatial light modulator, algorithms for varying the blaze period so as to effect beam steering, and algorithms to vary the blaze pitch.

Thus, a blazed phase grating can be created within a dual frequency liquid crystal spatial light modulator array. This can be accomplished by sending control signals, e.g., voltage signals of appropriate amplitude, frequency, and duty cycle, to the dual frequency liquid crystal spatial light modulator. The blazed grating deflects incident light by an amount dependent on the period of the grating. The beam deflection angle may be varied in time by varying the control signals. Thus, a beam of light, such as a laser beam, can be rapidly steered from one target to another.

The period and blaze angle can be controlled electronically, e.g., by blaze period and pitch control logic. Optionally, the beam can be monitored to determine the deflected beam angle and/or wavefront, so as to provide feedback that can be used to control the deflection angle.

Figure 1:
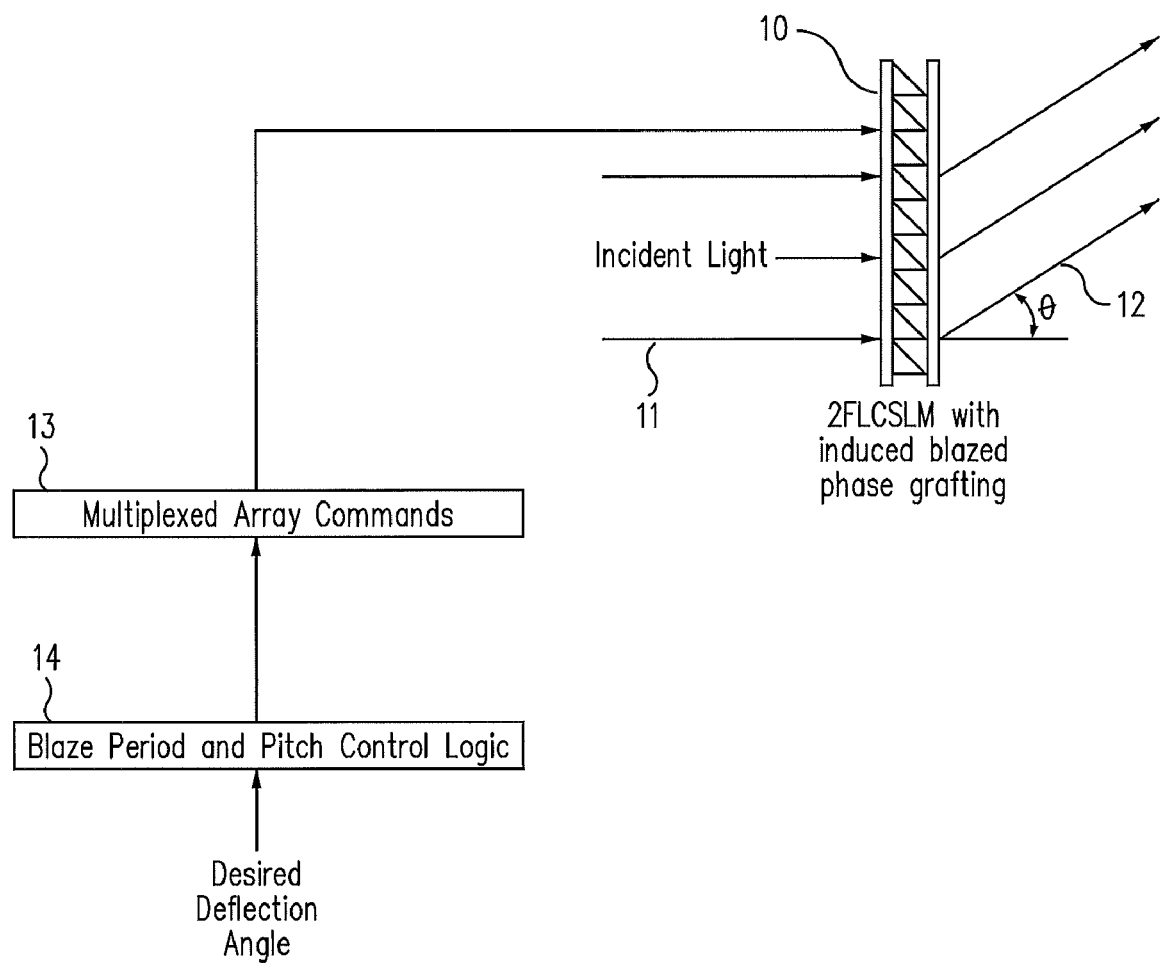
FIG. 1 shows a block diagram illustrating a beam steering system in accordance with an exemplary embodiment of the present invention.

FIG. 1 shows a beam steering system wherein a dual frequency liquid crystal spatial light modulator 10 receives incident light 11 and provides a steered beam 12, according to one exemplary embodiment of the present invention. That is, incident light 11 is transmitted through dual frequency liquid crystal spatial light modulator 10 and is affected thereby so as to introduce a deflection angle θ into the steered beam 12. Incident light 11 can come from a laser, such as a laser that is used to provide light which is modulated for communications or such as a laser that is suitable for use in a directed energy weapon.

More particularly, the deflection angle θ is defined by the period of an induced blazed phase grating formed within the dual frequency liquid crystal spatial light modulator 10. The period of the blazed phase grating can be electronically controlled, so as to provide the desired deflection angle θ.

Blaze period and pitch control logic 14 defines the blaze period and pitch required to provide desired deflection angle θ. Blaze period and pitch control logic 14 receives a signal representative of a desired deflection angle and provides a control signal to multiplexed array commands circuit 13, so as to effect the deflection of light by the desired angle. Multiplexed array commands circuit 13 controls dual frequency liquid crystal spatial light modulator 10, so as to create the necessary blazed phase grating thereon and thus effect deflection of incident light 11 by the desired deflection angle θ.

At least one embodiment of the present invention comprises a dual frequency liquid crystal spatial light modulator configured to facilitate field of view adjustment. Such embodiments of the present invention may find application in imaging, such as in photography (either film or digital) and telescopy, for example. Thus, at least one embodiment of the present invention comprises a non-mechanical way to rapidly change the direction and field of view of a remote imaging system, so as to provide a multiplexed output of targeted scenes. In this manner, a plurality of different scene can be simultaneously viewed substantially in real time.

According to one embodiment of the present invention, a liquid crystal spatial light modulator, such as a dual frequency liquid crystal spatial light modulator, is incorporated into an optical system to effect changes in the direction and/or area of the field of view. In addition to the dual frequency liquid crystal spatial light modulator, the optical system can comprise static components, such as refractive and/or reflective elements, e.g., lenses and/or mirrors. The optical system may also comprise optical elements that affect the polarization or wavelength of light.

Commands are issued by a data processing and control system, which in turn are translated into voltage signals that are communicated to the elements of the dual frequency liquid crystal spatial light modulator, so as to effect desired control thereof. The control signals effect a varying refractive index across the dual frequency liquid crystal spatial light modulator. Thus, the dual frequency liquid crystal spatial light modulator can function substantially like a programmable lens, whose optical properties can be rapidly changed.

The dual frequency liquid crystal spatial light modulator is used to vary the tilt and focus of incoming light. It may also be used (in combination with other optical elements) to vary a zoom or magnification incoming light. In combination with the static elements of the optical system, these changes effect the direction and field of view of an imaging system.

The changes can be made synchronously with respect to the acquisition frame rate of the monitoring system. By this means, successive image frames can be dedicated to multiple scenes. The frames from each scene are segregated electronically, so that they can be displayed and/or recorded independently.

Figure 2:
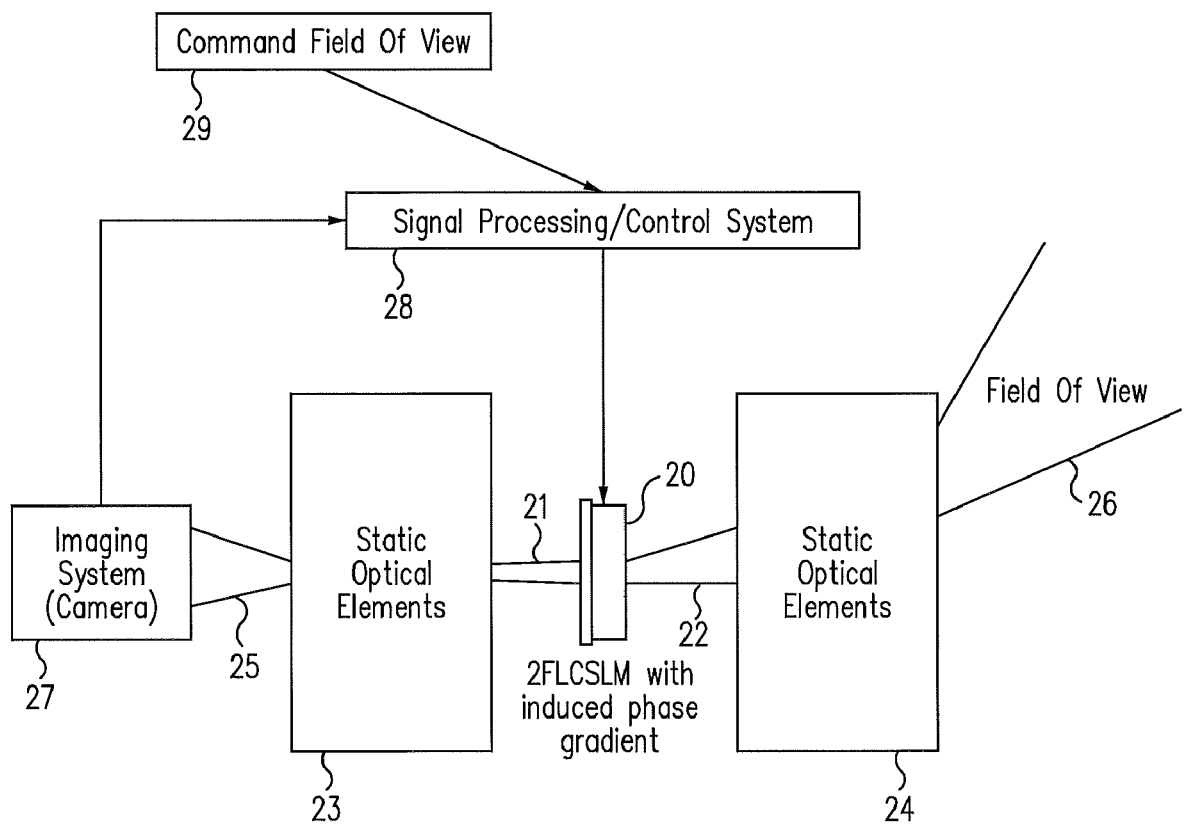
FIG. 2 shows a block diagram illustrating a field of view adjustment system in accordance with an exemplary embodiment of the present invention.

FIG. 2 shows a non-mechanical method and system for adjusting the field of view of a camera, according to one exemplary embodiment of the present invention. A dual frequency liquid crystal spatial light modulator 20 receives light 22 representing a field of view and provides light 21 processed thereby to an imaging system 27, such as that of a camera.

Optionally, static optical elements 23 and/or 24 are interposed within the optical path. For example, input side static optical elements 24 can receive light 26 that defines a field of view and can provide light 22 to dual frequency liquid crystal spatial light modulator 20. Input side static optical elements 24 can provide desired focus, zoom, polarization and/or filtering, for example.

Also, light 21 from dual frequency liquid crystal spatial light modulator 20 can be provided to output side static optical element 23, which in turn provide light 25 to imaging system 27. Output side static optical elements 23 can provide desired focus, zoom, polarization and/or filtering, for example.

Imaging system 27 can provide an electronic signal representative of an image of the field of view to a signal processing/control system 28, which in turn provides a control signal to dual frequency liquid crystal spatial light modulator 20, so as to effect viewing of the desired field of view. The control signal provided by signal processing/control system 28 can also determine the focus, zoom, or other desired optical parameters of the viewed image.

Commanded field of view circuit 29 provides a signal to signal processing/control system 28 that is representative of a desired field of view. That is, this control signal determines what field of view dual frequency liquid crystal spatial light modulator 20 is configured to provide. The desired field of field commanded by commanded field of view circuit 29 can be defined by either a human operator or an automated system.

Figure 3:
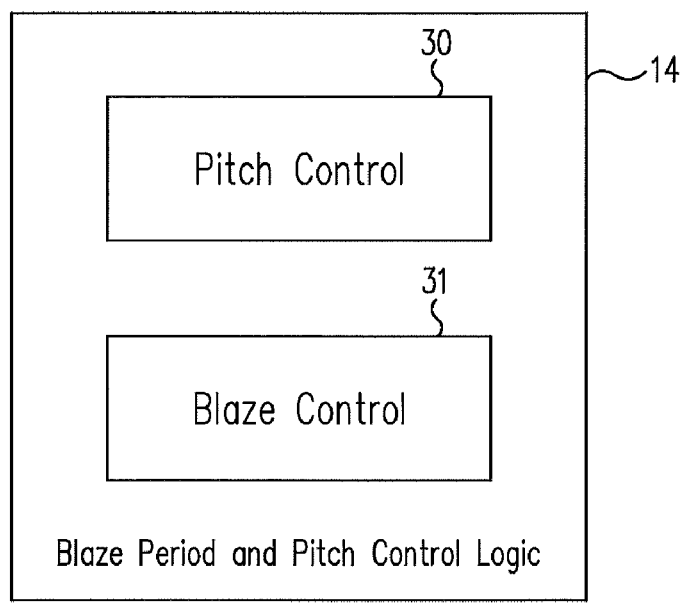
FIG. 3 shows a block diagram of the blaze period and pitch control logic of FIG. 1 in further detail.

Referring now to FIG. 3, the blaze period and pitch control logic 14 is shown in further detail. The blaze period and pitch control logic 14 can comprise a pitch control 30 and a blaze control 31.

The blaze period and pitch control logic 14 determines the exact geometry of the modulation characteristics. The equation that governs this geometry is:

$$\sin(\theta_d) = (\lambda n/s)\sin(\theta_i)$$

where $\theta_d$ is the angle of diffraction (the steered angle after passing the dual frequency liquid crystal spatial light modulator 10); $\theta_i$ is the angle of incidence coming into the dual frequency liquid crystal spatial light modulator 10; $\lambda$ is the wavelength of light being used; n is the diffraction order; and s is the pitch (which is the separation between the peaks in the diffraction grating).

It is worthwhile to note that the diffraction or steering angle is only controlled by the separation in the peaks, not by their individual depth. Steering does not depend on the absolute value of the optical path length modulation. Rather, the steering angle depends on the physical distance, i.e., the pitch, over which the angle changes.

The blaze angle, which defines the depth of the modulation, controls how much light goes into each order (n). Generally, it is desirable for all of the light to go into the first order. That requires a well defined, deep, modulation.

As is well known, diffraction gratings rely on phase to make light diffract into orders. Cheap or quickly made gratings will have a phase pitch, so that that light will go into a series of orders. However, the amount of light that goes into each order, as well as the angular spread of the order itself, will depend upon the exact construction of the individual modulations.

Modulations that are regular in shape, that are deep (not necessarily physically, but which have a strong effect, such as due to the alignment of the liquid crystal) will be said to have a strong blaze angle. This term originates from classical gratings, which were actually cut into metal. The shape of the individual ridges needed to be made into strong well defined edges, so that the diffraction angles would be well defined and therefore not have much angular spread and not have much stray scattering into background signals.

Figure 4:
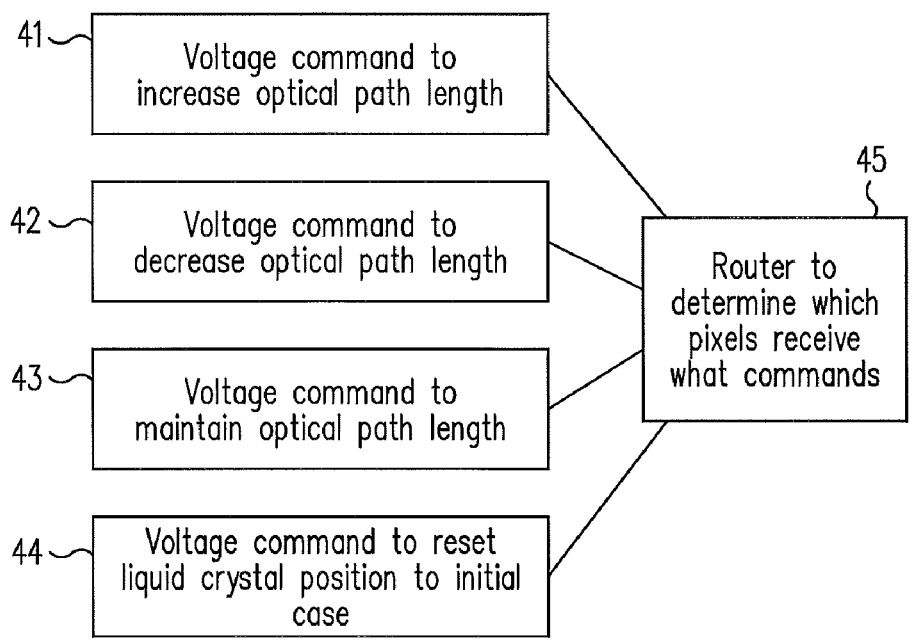
FIG. 4 shows a block diagram of voltage commands from the multiplexed array commands circuit of FIG. 1.

Referring now to FIG. 4, the multiplexed array commands circuit 13 can use voltage commands that are routed to pixels of the dual frequency liquid crystal spatial light modulator 10 so as to define a blazed phase grating that results in the desired steering angle.

More particularly, a voltage command can increase optical path length as shown in block 41. A voltage command can decrease optical path length as shown in block 42. A voltage command can maintain optical path length as shown in block 43. A voltage command can reset liquid crystal position to the initial case as shown in block 44.

A router can be used to determine which pixels of the dual frequency liquid crystal spatial light modulator 10 receive which commands as shown in block 45. That is, the router can route the voltage commands (such as those used to increase optical path length, decrease optical path length, maintain optical path length and reset the liquid crystal position) to individual pixels of the dual frequency liquid crystal spatial light modulator 10.

The array commands from multiplexed array commands circuit 13 are delivered to each pixel. Each of these commands can change the relative liquid crystal alignment. One important aspect of this is the optical path length change, which can modulated in the dual frequency liquid crystal spatial light modulator 10. In this manner, control is provided regarding which pixel or group of pixels needs this requires changes in order to provide desired beam steering.

Although the description herein refers to a dual frequency liquid crystal spatial light modulator, those skilled in the art will appreciate the other types of devices, e.g., other types of spatial light modulators, are likewise suitable, at least for some applications. Thus, discussion of the present invention as comprising a dual frequency liquid crystal spatial light modulator is by way of example only, and not by way of limitation.

Further, although the use of a single dual frequency liquid crystal spatial light modulator is discussed herein, those skilled in the art will appreciate that a plurality of dual frequency liquid crystal spatial light modulators or the like may alternatively be used, such as in tandem so as to provide a lensing effect that facilitates both focus and zoom.

According to one embodiment of the present invention, beam steering and field of view adjustment systems can be dedicated to a single particular function. That is, a beam steering system can perform beam steering without performing field of view adjustment and vice-versa. However, according to another embodiment of the present invention, a single system can perform both beam steering and field of view adjustment. This may be accomplished using at least some common components for these two functions. For example, a single dual frequency liquid crystal spatial light modulator can be used for both beam steering and field of view adjustment.

Thus, according to at least one embodiment of the present invention, a method and system for rapidly steering a light beam, such as for use in communications or weaponry, is provided. According to at least one embodiment of the present invention, a method and system is provided for changing a camera's field of view according to a multiplexing strategy is provided. Further, one or more embodiments of the present invention provide lightweight, small, non-mechanical beam steering and/or field of view adjustment systems that respond rapidly and do not require high voltages for operation.

Embodiments described above illustrate but do not limit the invention. It should also be understood that numerous modifications and variations are possible in accordance with the principles of the present invention. Accordingly, the scope of the invention is defined only by the following claims.

We claim:

1. A method for adjusting a field of view, the method comprising: communicating light from a field of view to a dual frequency liquid crystal spatial light modulator; controlling the spatial light modulator so as to communicate the light therefrom to an imaging device; and receiving the light by the imaging device.

2. The method as recited in claim 1, wherein the spatial light modulator is controlled so as to vary at least one optical parameter of light communicated therethrough.

3. The method as recited in claim 1, wherein the spatial light modulator is controlled so as to vary at least one of focus and zoom of light communicated therethrough.

4. The method as recited in claim 1, further comprising communicating light through at least one static optical element prior to communicating the light through the spatial light modulator.

5. The method as recited in claim 1, further comprising communicating light through at least one static optical element prior to communicating the light through the spatial light modulator, the static optical element being selected from the group consisting of: a refractive element; a reflective element; a polarization affecting element; and a wavelength affecting element.

6. The method as recited in claim 1, further comprising communicating light through at least one static optical element subsequent to communicating the light through the spatial light modulator.

7. The method as recited in claim 1, further comprising communicating light through at least one static optical element subsequent to communicating the light through the spatial light modulator, the static optical element being selected from the group consisting of: a refractive element; a reflective element; a polarization affecting element; and a wavelength affecting element.

8. The method as recited in claim 1, wherein controlling the spatial light modulator comprises using a blazed phase grating to determine the field of view.

* * * * *